Figure 1:
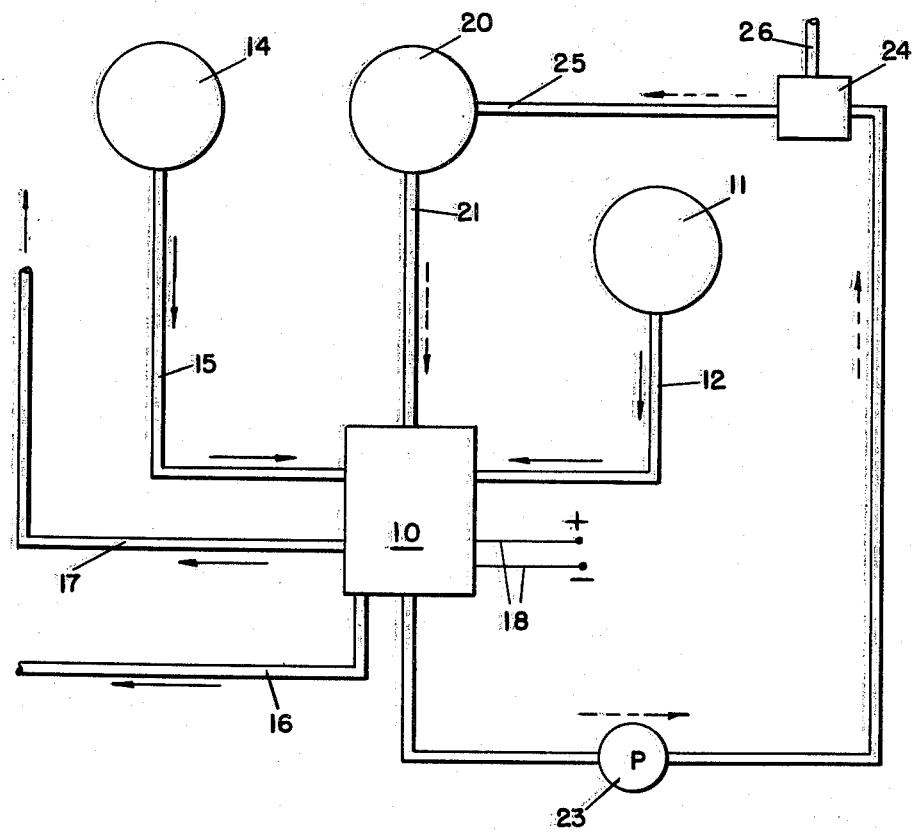

May 11, 1965  N. GILBERT  3,182,984
AMALGAM MIXING VESSEL FOR PRIMARY BATTERY SYSTEM
Filed April 23, 1962  2 Sheets-Sheet 1

INVENTOR
NATHAN GILBERT
BY
*J.T. Sheha*
ATTORNEY

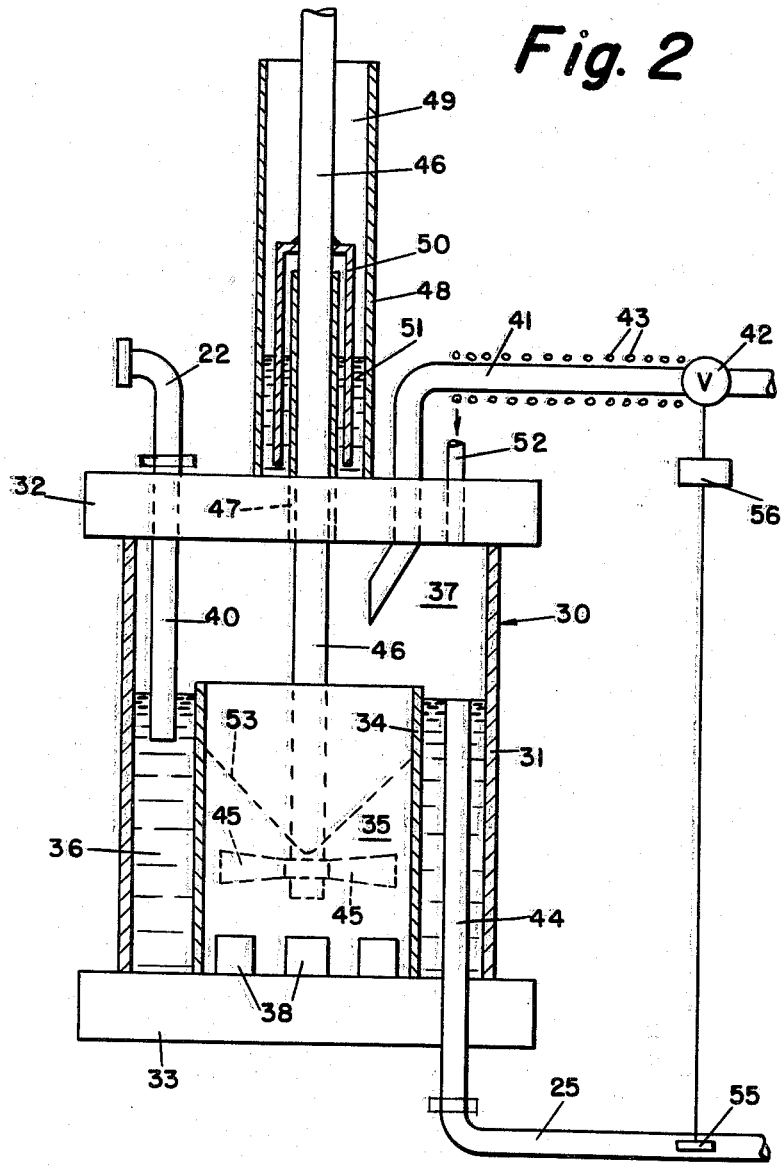

United States Patent Office 3,182,984
Patented May 11, 1965

3,182,984
AMALGAM MIXING VESSEL FOR PRIMARY
BATTERY SYSTEM
Nathan Gilbert, Fair Lawn, N.J., assignor, by mesne
assignments, to the United States of America as represented by the Secretary of the Navy
Filed Apr. 23, 1962, Ser. No. 190,203
1 Claim. (Cl. 266—34)

This invention relates to a primary battery system and is particularly concerned with such a system which is capable of delivering electrical energy continuously and at high rates by the efficient transformation of chemical energy into electrical energy.

It is known that electrical energy may be provided by the use of dry cells or storage batteries and while these elements have marked utility for certain purposes, they are deficient as sources of large reserve power without replacement or recharging. Primary battery cells are also known which employ, for example, zinc or similar metals as electrodes and a stationary body of fluid electrolyte but these have been found to provide inefficient operation because of low current production. In battery systems which use a stationary electrolyte, the by-products of the chemical reactions by which the electrical energy is obtained accumulate in the cell or system and result in the delivery of progressively decreasing amounts of electrical energy. Fuel cells have been proposed to supplant the conventional primary battery cells but these have generally been found to have practical defects and have gone into only limited experimental use or use in limited environments.

The primary battery system with which the present invention is concerned is described in Chemical Engineering Progress, vol. 57, February 1961, at pages 140 and 141. The system disclosed therein is particularly adapted for submarine use and is designed primarily to supplement the main power system and supply the power required for the auxiliary equipment and it may be used to supply power for propulsion of the vessel. The various reactants used in the instant battery system are supplied in a generally continuous manner and replenished as necessary in order that the output of electrical energy will be maintained substantially constant and the system operated at or near maximum efficiency. The battery system for which the present invention is especially adapted involves the use of group of a selected number of fuel cells, depending on the electrical output required, which are connected as desired in series or in series parallel and to which are supplied the reactants comprising an alkali metal such as sodium and an oxidant such as oxygen or air and sea water which provides the electrolyte for the system.

Since certain alkali metals, such as sodium, will form an explosive mixture with the sea water electrolyte, the system contemplates admitting the selected metal in the state or form of an amalgam to the cells. Preparation of the amalgam of the desired or necessary concentration for use in a continuous system presents a problem in that it has been found difficult to intimately mix the metal with the mercury and therefore particularly difficult to provide an amalgam of the desired concentration. A substantially complete and intimate mixture of the metal and mercury in necessary since the mercury, in effect, functions primarily as a carrier for the metal and the metal content of the amalgam for the present primary battery system must be maintained at an extremely low value.

The problem of obtaining a sodium amalgam for use in the present battery system is more complex than simply adding sodium to mercury since the sodium concentration must be of a precise value and, additionally, the amalgam must be very pure and free of the formation of oxides. These oxides are insoluble in the amalgam and will form deposits on the cell plates and other cell surfaces which present operating difficulties. It has been determined that a sodium concentration above 0.55% in the amalgam results in the formation of a slurry consisting of a solid phase of approximately 0.7% sodium and a liquid phase of 0.55% sodium and that the solid amalgam phase will plug orifices in the cell equipment and filters and cause lowered operating efficiencies. A proper sodium concentration has been found to be of the order of 0.5%.

The broad object of the present invention is to provide an amalgam containing an alkali metal for use in a primary battery system.

Another object is to provide for the controlled supply of alkali metal to an amalgam to maintain the amalgam at desired metal concentration for use in a primary battery system.

Still another object is to regenerate a body of amalgam of reduced metal concentration by agitation of the amalgam in a manner to form vortex therein for receiving added metal and provide an intimate mixture for use in a primary battery system.

A more specific object is to provide for the intimate mixing of controlled amounts of sodium with sodium amalgam by agitation of the amalgam to form a cavity for receiving the sodium and provide an intimate mixture with the amalgam for use in a primary battery system.

Other objects will become apparent from a more detailed understanding of the invention.

In the drawings:
FIG. 1 is a flow diagram of one arrangement of a primary battery system with which the present invention is used;
FIG. 2 is a view in sectional elevation of a sodium and amalgam mixing or regeneration vessel for the system of FIG. 1 and showing structural details and controls for effecting desired sodium concentration.

Referring to FIG. 1, it will be understood that the elements of the primary battery system shown therein will be arranged within a submarine in a manner to occupy a minimum of space and this factor and such other factors as roll and pitch of the submarine must be considered in the structural design of certain of the elements in order to insure proper operation of the system.

The group of battery cells is indicated at 10, the source of electrolyte is indicated at 11 and in this battery system the electrolyte is sea water which is supplied to the cell group 10 by line 12 while an oxidant source is indicated at 14 and may be oxygen or air which is supplied to the cell group 10 by line 15. The amalgam circuit of the battery system is shown by the arrowed broken lines and will be described in detail later. As indicated by the arrowed broken line circuit, the amalgam is recirculated through the cell group 10 and as the reaction takes place therein used sea water and other waste will be removed by line 16, inert gases from the cell group will be removed by line 17 and the electrical energy will be taken off, for example, by leads 18.

Although the invention is applicable to other alkali metals, particularly those having a melting point of upwardly of 210° F., the following detailed description will be confined to the use of sodium.

Referring to the broken line amalgam circuit of FIG. 1, 20 indicates a source or vessel for the sodium amalgam which is supplied to the system at the desired sodium concentration, for example, 0.5% sodium. The amalgam is supplied by line 21 to the cell group 10 and removed at reduced sodium concentration by line 22 and fed by pump 23 to an amalgamator or regenerator zone 24 from which it is sent at the desired sodium concentration by line 25 to the source or vessel 20 for recirculation. Sodium is supplied to the amalgamator or regenerator 24 in controlled amounts by line 26 as will be explained in connection with the following description of FIG. 2.

Referring to FIG. 2, the amalgam at reduced sodium concentration in conduit 22 of FIG. 1 through which the amalgam is removed from the cells is delivered to a mixing device 30. The mixing device comprises an outer pressure vessel formed of an upright outer cylinder 31 having top and bottom walls 32 and 33 respectively and an inner open end cylinder 34 spaced from the side wall 31 and having its lower end disposed on the bottom wall 33. The relative arrangement of the outer cylinder 31 and inner cylinder 34 provides an inner amalgam zone 35, an outer annular amalgam zone 36 and an upper gas zone 37. The inner zone 35 communicates at its lower end with the outer zone 36 by means of a circumferential group of openings 38 at the lower end of cylinder 34 and the gas space 37 exists above both the inner and outer amalgam zones.

The conduit 22 communicates directly with the outer annular chamber 36 by means of an inlet conduit 40 which extends through the upper wall 32 of the pressure vessel in sealed relation therewith and may have its outlet end disposed below the upper end of the inner cylinder 34 as shown. Sodium is supplied directly to the inner amalgam zone 35 by means of a conduit 41 which also extends through the upper wall 32 and has a valve 42 for controlling flow and heating means in the form of a coil 43 thereabout for the purpose of maintaining the sodium in molten state. An outlet conduit 44 extends through the bottom wall 33 and is in communication at its lower end with the amalgam outlet line 25 described in connection with FIG. 1 for recirculation of the amalgam to the cells 10 and has its upper open end disposed in a plane somewhat below the upper end of inner cylinder 34.

The mixing apparatus has a rotatable agitator for providing an intimate mixture of the amalgam at reduced sodium content supplied by conduit 22 with the sodium supplied by conduit 41 by effecting a circulation of amalgam and sodium in zone 35 through the openings 38 and into the annular chamber 36 for passage through outlet conduit 44 and delivery back into the system. The agitator may conveniently take the form of a group of propeller blades 45 fixed to the lower end of a rotatable shaft 46 which extends through an opening 47 in the top wall 32 of the mixing apparatus and rotation of the shaft 46 will preferably be by means of a motor, not shown. Since sodium admitted by conduit 41 liberates heat upon admixture with amalgam in zone 35 it is necessary to seal the shaft to contain the mercury vapors formed during the mixing operation. For this purpose a mercury seal is formed by means of a tubular housing 48 which is supported on the top wall 32 about the shaft 46 providing an annular space 49 while a sleeve 50 is secured at its upper end as shown to the shaft 46 and has its lower end extending into space 49 to form a seal with mercury indicated at 51. An inert gas is supplied by a conduit 52 which extends through the upper wall 32 for blanketing the amalgam in the zones 35 and 36.

In operation, rotation of the agitator blades 45 will cause the body of amalgam in the inner chamber 35 to flow downwardly and through the lower openings 38 and the body of material will acquire the general configuration of a vortex or cavity as indicated by the broken lines 53 within which the sodium from conduit 41 will be received and intimately mixed with the amalgam.

In order to maintain the amalgam leaving the mixing device at desired concentration, means in the form of a sensor 55 is located in the outlet conduit 25 in the path of the regenerated amalgam and is connected to operate the valve 42 located in the sodium line 41 through a controller 56. The sensor and controller means are not shown in detail since such equipment is well known in the control art. It will be understood however that the valve 42 in line 41 will be operated by the voltage output of sensor 55 which is in accordance with the sodium content of the amalgam in line 25.

It will be understood that suitable valves will be provided in conduits 22 and 25 for the purpose of maintaining the desired level of regenerated amalgam in zone 36 for properly supplying the system. The level of the amalgam in this zone will be maintained somewhat above the level shown in FIG. 2 when the agitator 45 is in operation and amalgam circulated through the zones 35 and 36.

I claim:

In a primary battery system wherein amalgam of standard alkali metal concentration is admitted to a fuel cell for producing electrical energy and amalgam of reduced alkali metal concentration is removed from the cell and sent to regeneration apparatus for receiving additional alkali metal to bring the reduced amalgam up to standard concentration, the improvement in regeneration apparatus which comprises, (a) a closed outer vessel having upper and lower end walls interconnected by a cylindrical side wall, (b) an inner cylinder disposed in spaced concentric relation with the cylindrical side wall of the vessel providing an outer annular chamber, (c) said cylinder having its lower end disposed on the lower end wall of the vessel and its upper end spaced from the upper end wall of the vessel, (d) a supply conduit for the amalgam of reduced concentration having an open end vertically aligned with the annular chamber for feeding directly thereinto and a removal conduit for standard amalgam having an open end communicating with the annular chamber, (e) said open end of the supply conduit being spaced circumferentially from the open end of the removal conduit in order to prevent passage of the amalgam of reduced concentration directly to the removal conduit, (f) said open end of the removal conduit being positioned below and adjacent the upper end of the inner cylinder to maintain a body of amalgam in the annular chamber, and to prevent passage of amalgam into the cylinder, (g) a group of apertures circumferentially of the cylinder at its lower end providing communication between the cylinder and the annular chamber, (h) a conduit extending through the upper end of the vessel for admitting molten alkali metal to the cylinder through its upper end and (i) a rotatable agitator extending into the cylinder and disposed above the group of apertures for directing the alkali metal through the apertures into the body of amalgam in the outer chamber for admixture therewith to form the standard amalgam, whereby the locations of the amalgam supply conduit, the removal conduit and the alkali metal supply conduit, and the action of the agitator cooperate to prevent passage of amalgam into the inner cylinder.

(References on following page)

References Cited by the Examiner

UNITED STATES PATENTS

| | | | |
|---|---|---|---|
| 1,876,994 | 9/32 | Mann | 259—97 X |
| 2,038,221 | 4/36 | Kagi | 266—34 X |
| 2,171,312 | 8/39 | Meyers. | |
| 2,438,204 | 3/48 | Castner | 259—97 X |
| 2,698,219 | 12/54 | Martin | 23—285 X |

FOREIGN PATENTS 226,217   1/60   Australia.

OTHER REFERENCES

Miller: Chemical Engineering Progress, vol. 57, pp. 140, 142 (February 1961).

MORRIS O. WOLK, *Primary Examiner.*